(12) United States Patent
Wu

(10) Patent No.: US 11,303,759 B2
(45) Date of Patent: Apr. 12, 2022

(54) GATEWAY FUNCTION CONTROL VIA TELEPHONY/VOICE SERVICE

(71) Applicant: ARRIS Enterprises LLC, Suwanee, GA (US)

(72) Inventor: Jinghui Wu, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/736,343

(22) PCT Filed: Jul. 7, 2017

(86) PCT No.: PCT/CN2017/092258
§ 371 (c)(1),
(2) Date: Dec. 14, 2017

(87) PCT Pub. No.: WO2019/006752
PCT Pub. Date: Jan. 10, 2019

(65) Prior Publication Data
US 2020/0120212 A1 Apr. 16, 2020

(51) Int. Cl.
*H04M 11/00* (2006.01)
*H04L 12/28* (2006.01)
*H04M 7/00* (2006.01)

(52) U.S. Cl.
CPC ....... *H04M 11/007* (2013.01); *H04L 12/2898* (2013.01); *H04M 7/0069* (2013.01); *H04M 2203/1016* (2013.01)

(58) Field of Classification Search
None
See application file for complete search history.

(56) References Cited

U.S. PATENT DOCUMENTS

| 6,621,812 B1 * | 9/2003 | Chapman | H04L 12/2801 370/346 |
| 2002/0001302 A1 * | 1/2002 | Pickett | H04L 12/2856 370/352 |

(Continued)

FOREIGN PATENT DOCUMENTS

| CN | 101212428 A | 7/2008 |
| CN | 102195839 A | 9/2011 |

(Continued)

OTHER PUBLICATIONS

PCT International Search Report & Written Opinion, RE: Application No. PCT/CN2017/092258, dated Mar. 30, 2018.

(Continued)

*Primary Examiner* — Kenny S Lin
*Assistant Examiner* — Richard Schnell
(74) *Attorney, Agent, or Firm* — Wenderoth, Lind & Ponack, L.L.P.

(57) ABSTRACT

An apparatus, method and computer readable memory comprises a voice service interface for allowing user control of a gateway. The voice service interface comprises a voice service module operable to interface with a telephonic communication device to process and receive gateway configuration entries from the user through the telephonic communication device. The voice service module is operable to transmit the gateway configuration entries to a gateway controller. The gateway configuration entries are configured to be parsed and applied to the gateway for control, configuration and/or diagnostic of the gateway. Gateway configuration entries include control function changes such as home gateway device reboot, Wi-Fi, enabling/disabling/configuration, parent control enabling/disabling/configuration, and other intended gateway functionalities.

19 Claims, 8 Drawing Sheets

(56) References Cited

U.S. PATENT DOCUMENTS

2005/0053222 A1* 3/2005 Lee .................. H04M 7/006
                                                  379/219
2006/0285535 A1* 12/2006 Metcalf ............. H04L 65/1036
                                                  370/352
2007/0091848 A1* 4/2007 Karia ................ H04L 65/1083
                                                  370/331
2009/0248794 A1* 10/2009 Helms ............... H04L 12/2861
                                                  709/203

FOREIGN PATENT DOCUMENTS

| CN | 105515848 A | 4/2016 |
|----|-------------|--------|
| EP | 2352268 | 8/2011 |
| JP | 104917673 A | 9/2015 |

OTHER PUBLICATIONS

Extended European Search Report dated Sep. 17, 2020 in European Patent Application No. 17917207.7.
Office Action dated Feb. 18, 2021, in corresponding Canadian Patent Application No. 3,069,023.

* cited by examiner

GATEWAY FUNCTION CONTROL VIA TELEPHONY/VOICE SERVICE

1. FIELD OF THE INVENTION

The present invention relates to use of voice service, such as Voice over Internet Protocol (VoIP), apparatuses and systems for user enabled configuration, control and/or diagnosis of a gateway (GW).

2. DESCRIPTION OF THE PRIOR ART

GW functionalities, including configuration, diagnostic and control, are typically managed by a user through one or more graphic user interfaces (GUI) via local area network (LAN) and/or wide area network (WAN) devices. The GUI allows users to interact with electronic devices, including computers, tablets and/or handheld mobile devices, through direct manipulation of graphical icons and visual indicators such as secondary notation, instead of text-based user interfaces, typed command labels or text navigation. In a gateway device, the configuration GUI is typically provided by way of a link. With a provided user name and password, the user can use a web browser to login to the link from any LAN and/or WAN device and configure/change the GW settings. Multiple systems operators (MSO) can use a different user name and password, to do more configurations, which are not available for normal users.

However, GUI use for controlling GWs are problematic in situations where the user is visually impaired or unfamiliar with the GUI, where data service is slow or unavailable, the home gateway device LAN/WAN/GUI is experiencing troubles, or there is limited or no access to a Wi-Fi or Internet enabled device, computer or mobile handheld device.

Based on the foregoing, there exists a need in the art for alternative devices and/or methods that enable a user to configure/control and/or diagnose a GW without the use of GUI.

SUMMARY OF THE INVENTION

The present invention is directed toward alternative apparatuses and methods providing configuration, control and/or diagnostic of a GW through a voice service application. The voice service application operates to deliver voice services in addition to Internet service.

In an aspect of the invention, a voice service apparatus for allowing user control of a gateway is provided. The voice service apparatus comprises a gateway controller and a voice service module operable to interface with a telephonic communication device to process and receive gateway configuration entries from the telephonic communication device. The voice service module is operable to transmit the gateway configuration entries to the gateway controller. The gateway configuration entries are configured to be parsed and applied to the gateway for control, configuration and/or diagnostic of the gateway.

In another aspect of the invention the voice service module comprises a Voice over IP (VoIP) module. The VoIP may comprise embedded multimedia terminal adapter (E-MTA/MTA), incorporated into the cable modem for providing telephone service, integrated with DOCSIS home gateway. In another aspect of the invention the VoIP module comprises a stand-alone VoIP application. The stand-alone VoIP application is stored and operable through a server cloud and after the gateway configuration entries are collected via cloud VoIP and transmitted to and applied to the gateway.

Yet another aspect of the invention provides that the apparatus comprising a voice service is an apparatus for providing internet applications comprising: an input for receiving an input signal; a wireless controller configured to communicate via wireless with a client device, and receive from the client device internet access requests for providing internet applications; a controller configured to establish internet connections with the client device via the wireless controller, and send the requested content to the client device; network connection circuitry; and a gateway controller configured to: parse and apply the determine gateway configuration entries from the voice service module to the gateway for control, configuration and/or diagnostic of the gateway. Preferably, the apparatus for providing internet applications includes a gateway device, which can be used for all internet applications including content streaming, as well as internet access, e-mail, web browsing, chatting, etc.

Another aspect of the invention provides a voice service interface method for user control of a wireless gateway, comprising: establishing a connection between a telephonic communication device and a voice service module; interfacing the voice service module with the telephonic communication device to process and receive gateway configuration entries from the telephonic communication device; transmitting the gateway configuration entries to the gateway; whereby the gateway configuration entries are configured to be parsed and applied to the gateway for control, configuration and/or diagnostic of the gateway.

One or more non-transitory computer readable media having instructions operable to cause one or more processors to perform the operations is provided in another aspect of the invention. The one or more non-transitory computer readable media having instructions operable to cause one or more processors to perform the operations comprising: establishing a connection between a telephonic communication device and a voice service module; interfacing the voice service module with the telephonic communication device to process and receive gateway configuration entries from the telephonic communication device; transmitting the gateway configuration entries to the gateway; whereby the gateway configuration entries are configured to be parsed and applied to the gateway for control, configuration and/or diagnostic of the gateway.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
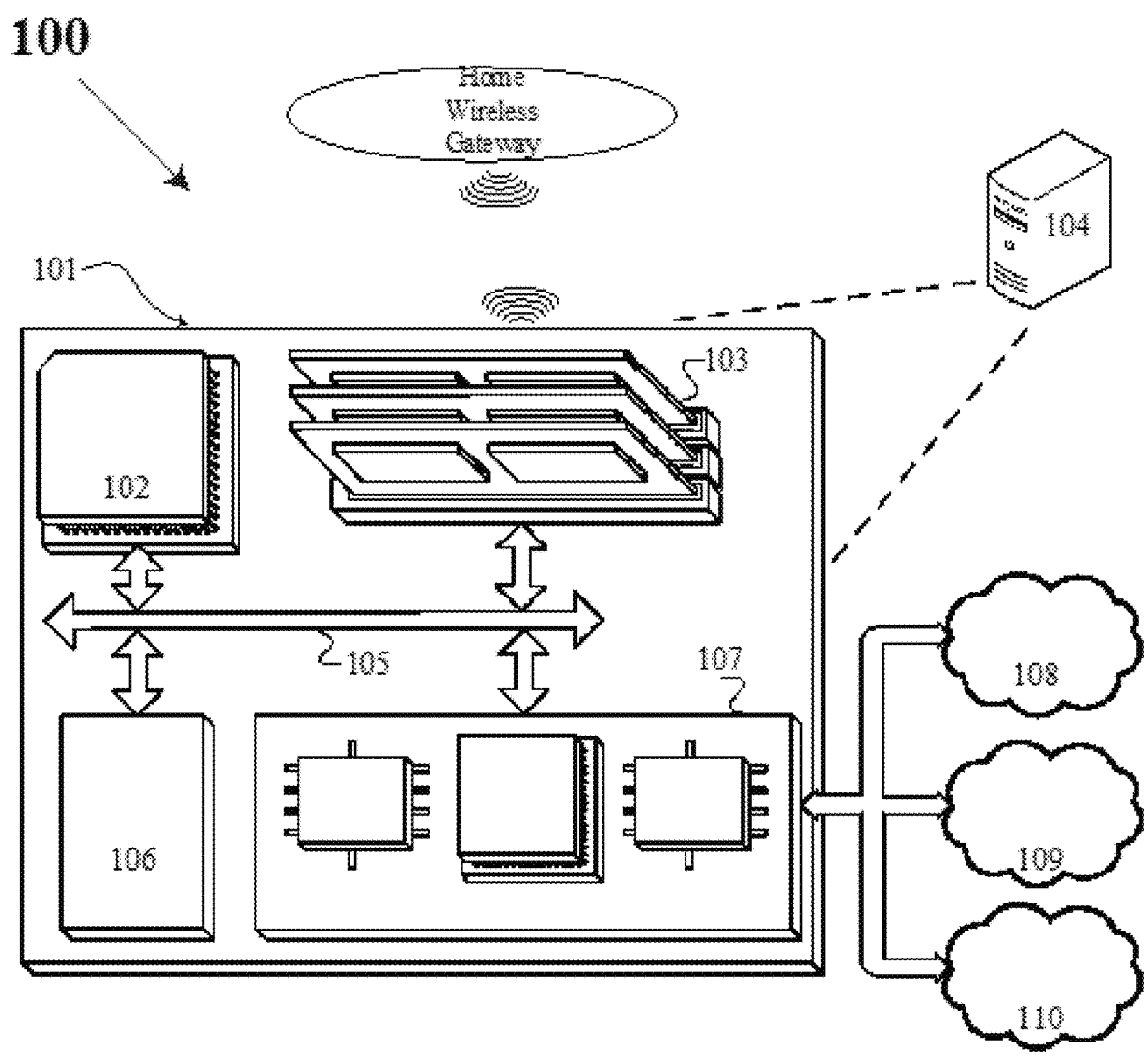
FIG. 1 is a block diagram illustrating components of network interfacing apparatus comprising a voice service interface for allowing user control of a gateway.

The apparatus, method and computer readable media of the subject invention include a network interfacing or voice service interface having a voice service module allowing a user to control home gateway (GW) functions and features through voice services. While the GW functionalities are controllable via GUI through LAN/WAN, the subject invention provides an alternative way for users to configure/control and/or diagnose the GW, taking advantage of the more wildly deployed and higher QoS telephony interfaces. The subject invention's voice control of the GW has particular applications for the visually impaired, as well as for those who have difficulty utilizing GUI, have poor network connectivity, or who have interrupted or a lack of access to Internet services.

The term "user" herein refers generally to the client or consumer of the gateway. The term multiple system operator "MSO" or "provider" herein refers generally to the operator or operating entity of operators of multiple cable television/Internet systems. Gateway (GW) devices herein include apparatuses used for internet applications including content streaming, as well as internet access, e-mail, web browsing and/or searching, chatting, and the like. Gateway devices referred to herein, include without limitation, gateway access points (GW APs), extender access points (APs) and other wireless content streaming apparatuses. The apparatus herein may be a stand-alone device adapted to communicate with a GW device. Client device herein refers to a device communicating via the 802.11 protocol (Wi-Fi) wireless network including, without limitation, a computer, laptop or Smartphone. Generally, the wireless gateway is a wireless gateway access point (GW or GW AP) configured with the gateway controls. Telephonic communication device herein generally, without limitation, refers to home or business telephones, digital enhanced cordless telecommunications (DECT), public service telephone service (PSTN) telephones, mobile telephones (2G/3G/4G/Satellite . . . ) and other devices (Pads, PCs, . . . ) connected through land-lines or through wireless and/or Internet services, mobile handheld cellular devices such as cell phones and tablets having telephone capabilities, and basically systems that converts acoustic vibrations to electrical signals in order to transmit sound, typically voices, over a distance using wire or radio utilized by consumers.

The present invention enables the user to perform many home gateway device configurations and controls, including but not limited to home gateway reboot, Wi-Fi enabling/disabling/configurations, Parent Control enabling/disabling/configurations, and many other intended home gateway functionalities, via voice service instead of GUI, by using telephone lines at home, mobile/PSTN calling inside/outside home, mobile/pad/laptop App, and the like.

The subject invention utilizes a number of communication devices to connect to the network interfacing apparatus to modify the functions and features of the home wireless gateway. These communication devices include smart phones as well as plain old previous generation cell phones. Computers/tablets with Internet access are also contemplated, and may be used through execution of software/applications (such as the Internet telephony service provider Skype) to access the telephony network via Internet and call any phone number, to make a call and trigger the subject invention. These communication devices use a downloaded 'App which requests the user to sign in with a user name and password to access and modify the network interfacing apparatus, and instructions are delivered by the network interfacing apparatus to change the features and functions of the home wireless gateway. When a plain old telephone is used, the user voice commands are transferred to digital packets using a voice over Internet protocol device and digitized packets are delivered to the network interfacing apparatus of the home gateway device. A typical home gateway device comprises a network access module (DOCSIS, ADSL, etc. . . . ), a built-in GW for connecting client devices to the network, and a VoIP module. The device can instead be a "stand-alone" GW or router, in which case it does not have network access module and VoIP module built-in.

While the GW functionalities are always controllable via GUI through LAN/WAN, this network interfacing apparatus having a media terminal adapter (MTA) provides an alternative way to configure/control GW functionalities. The subject network interfacing apparatus provides users with more widely deployed analog low technology telephone interface capability. This is particularly useful when: 1) the user is visually impaired; 2) the user is not familiar with GUI; 3) data service is not available or does not have fast communication speeds; 4) the LAN/WAN/GUI in home gateway device is experiencing some troubles at the time, and 5) the user has no Wi-Fi devices/laptop/computer at the time.

The gateway configuration via voice, can be effected in multiple ways, not only by using the telephone at home, but also through use of public service telephone service (PSTN), mobile telephones (2G/3G/4G/Satellite . . . ) and other devices (Pads, PCs, . . . ) outside the home. To use this feature, the user dials in to access the network interfacing device: a) If the user is at home, the telephone lines connect to the telephony gateway home gateway device by dialing a special entry configured in the digit map of the MTA module. For example, user can dial '*999' to use the feature; b) Whether the user is at home or not, the mobile phones, PSTN phones or any other kind of phones can be used to dial the user's home number that is provided by multiple-system operator (MSO) and served by the network interfacing device's MTA module; c) The external caller numbers can be pre-configured for the home gateway device. When receiving a call from one of these pre-configured numbers, the home gateway device can connect the call and ask the user if he/she would like to configure/control the GW or make a phone call. For example, the home gateway device can play an announcement such as "press 1 to control the gateway, press 2 to make a phone call"; d) if the user would like to control the GW from any external phone number, then the external caller numbers need not be pre-configured. In this case, the home gateway device can do the same as described above, and ringing of each incoming non GW Controlling call will be delayed for a few seconds; e) The feature can be configured via a management information base (MIB) part of a simple network management protocol (SNMP) or GUI to be available from any external phone numbers to perform corresponding function configuration/control.

The present invention extends the interface to multiple MTA/voice/telephony interfaces, including telephone lines at home, mobile/PSTN calling inside/outside home, mobile/pad/laptop App, and the like. It enables the user to perform many home gateway configurations and controls, including but not limited to home gateway device reboot, Wi-Fi, enabling/disabling/configurations, Parent Control, enabling/disabling/configurations, and many other intended home gateway functionalities. Although some functions may be considered not useful, the user is provided with a method and means to figure out and implement a set of useful functions.

In an aspect of the invention the voice service module is provided as an embedded Voice over IP (VoIP) module in the gateway device. Preferably the gateway device is a DOCSIS home gateway device, which has an embedded VoIP module called media terminal adaptor (MTA). However, the subject invention expands to cover other gateway devices, voice service apps, VoIP modules, etc. without limitation.

In another aspect of the invention the voice service module is provided as a stand-alone VoIP application running on cloud (e.g. an application server). After the configured parameters are collected via cloud VoIP, that are sent to the gateway device.

The system can also implement authentication functions and ask the user to enter an administrator password before controlling the gateway. In this case, there can be provided advanced user capabilities.

Instead of implementing authentication functions on the gateway device, the system can request the MSO to check the password. For example, the user can dial and provide a password when prompted, whereupon the gateway device sends this information to the MSO's call server via Session Initiation Protocol (SIP) message. The user then will be able to control the gateway if the password matches that in the MSO's database.

The IP devices using software like Skype, and PSTN phones and mobile phones dial phone number of the home gateway device. When receiving this phone call, the MTA module collects the information and configures the Gateway functionalities. The MTA and Gateway modules are all within the same device and can be communicated internally. External protocols like Simple Network Management Protocol (SNMP) are not needed; unless when voice service runs on cloud.

Specifically, the user of the mobile device has a plurality of methods to communicate with the gateway to control the functions of the gateway.

The objective of this invention is to provide a method or means to control the functionalities of a gateway device via voice service, as an alternative to GUI in scenarios mentioned, especially for visually impaired persons.

The home gateway with function control via multiple telephony/voice interface may include a home gateway device connected to an Internet protocol (IP) network having connectivity to user devices including pads, laptops, PCs and IP enabled phones, mobile phones through a mobile network and traditional phones through the PSTN. The home gateway device having an embedded MTA voice module connects to a traditional landline phone. The MTA module recognizes and collects the user inputs and selections from the analog voice information from home, or digital packets from IP network originated from mobile/PSTN phones, and uses the collected information to change the gateway functions. The control of the home gateway device functions is available through a traditional landline phone. Control of home gateway device functions is also available through an Internet connected mobile phone, pad device, lap top, PC or PSTN connected phone that accesses the IP network. Modification of the home gateway device control functions include home gateway reboot, Wi-Fi, enabling/disabling/configurations, Parent Control enabling/disabling/configurations, and all other intended GW functionalities. The control of home gateway device functions is available through MTA connected traditional landline phones within the home as well as mobile telephones connected through a mobile network, and IP user devices including pad devices, lap tops, PCs, IP enabled phones and traditional phones connected to a PSTN accessing IP network that sends code to a home gateway device to change the functionalities.

FIG. 1 is a block diagram 100 illustrating components of network interfacing apparatus 101 comprising the subject voice service interface for allowing user control of a gateway, particularly user control of gateway functions. In the embodiment shown in FIG. 1, an IP network Interface comprising a VoIP, and/or VoIP with embedded multimedia terminal adapter (E-MTA/MTA) is shown at 104. Preferably, VoIP device 104 is embedded with multimedia terminal adapter (E-MTA/MTA), integrated with DOCSIS home gateway operable to facilitate telephone calls from standard non-smart telephones. The hardware 101 includes a processor 102, a memory 103, a storage device 106, and an input/output device 107. Each of the components 102, 103, 106, and 107 are interconnected using a system bus 105. The processor 102 is capable of processing instructions for execution within the apparatus 101. The processor 102 is a single-threaded processor or a multi-threaded processor. The processor 102 is capable of processing instructions stored in the memory 103 or on the storage device 106. The memory 103 stores information such as username and password as well as home wireless gateway preferences. The memory 103 is a computer-readable medium which may be a volatile memory unit or a non-volatile memory unit. In some implementations, the storage device 106 is capable of providing mass storage for the device 101. In one implementation, the storage device 106 is a computer-readable medium. In various different implementations, the storage device 106 can, for example, include a hard disk device, an optical disk device, flash memory or some other large capacity storage device. The input/output device 107 provides input/output operations for the device 101.

In one implementation, the input/output device 107 can include one or more of a public switched telephone network (PSTN) trunk interface 108 (e.g., an RJ11 connector), an IP network interface device (e.g., an Ethernet card), a cellular network interface 109, a serial communication device (e.g., an RS-232 port), and/or a wireless interface device (e.g., an 802.11 card). In another implementation, the input/output device can include driver devices configured to receive input data and send output data to other input/output devices, as well as sending communications to, and receiving communications from various networks. The VoIP device (e.g., UA A) 104 receive spoken instructions and digitize the data packet for execution in one or more processing devices. Such instructions can, for example, comprise interpreted instructions, such as script instructions (e.g., JavaScript or ECMA Script instructions), or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

Figure 2:
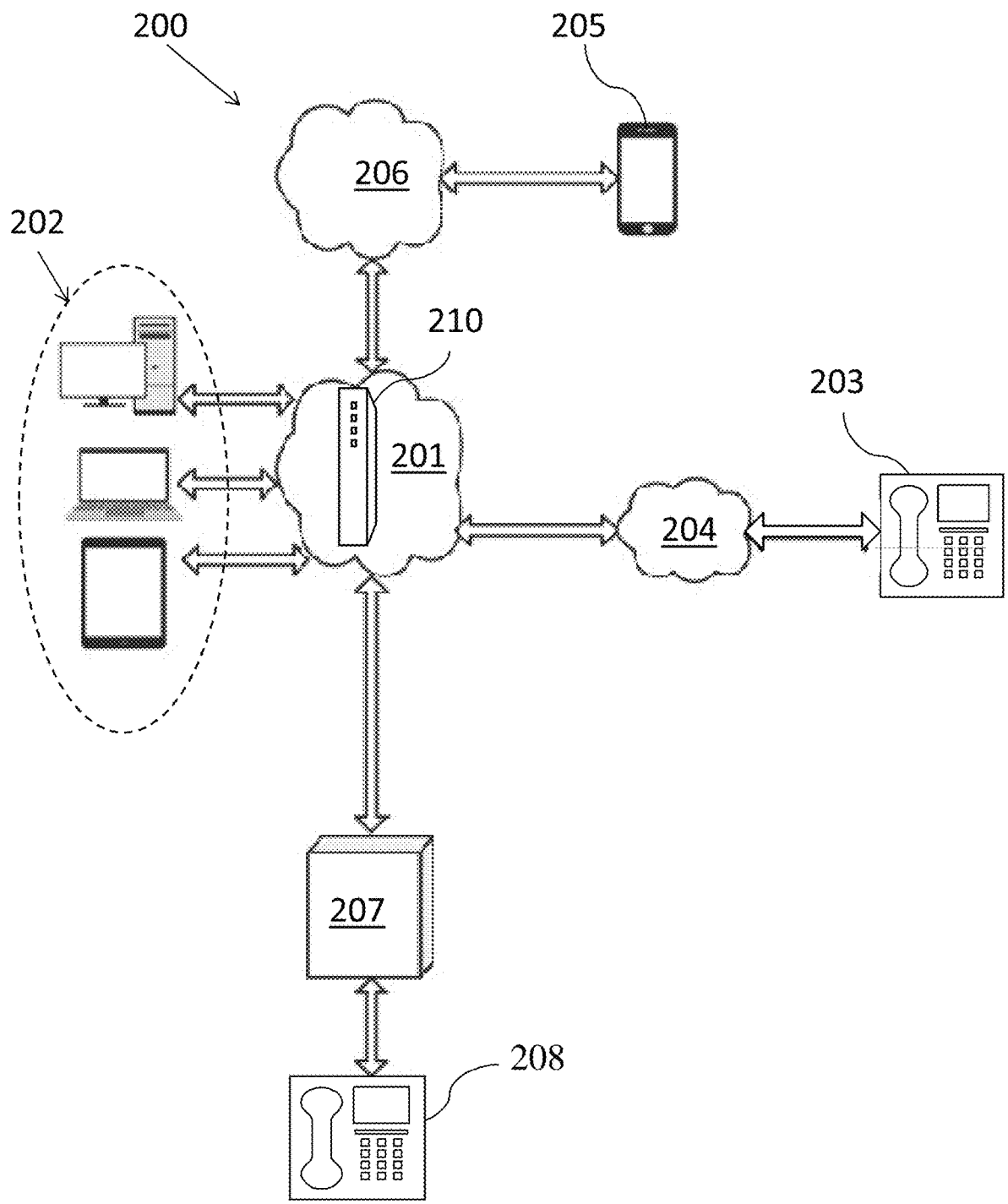
FIG. 2 illustrates details of various connections to the network interfacing apparatus comprising a voice service interface for allowing user control of a gateway.

FIG. 2 illustrates details of various connections to the network interfacing apparatus, shown generally at 200. An Internet protocol (IP) network 201 is connected to a plurality of user devices 202, including but not limited to a. tablet, lap top and personal computer, through a gateway device 210. Gateway device 210 includes access points (APs), network extenders containing access points (AP), repeaters, and other contemplated content streaming apparatus having wireless capabilities. The IP network 201 is herein shown connected to a telephone 203, such as a traditional phone, through a public switched telephone network (PSTN) 204. Mobile phone devices, as shown at 205, are connected to the IP network through gateway device 210 via mobile network 206, which may be a GSM, 3G or 4G connection. The gateway device 210 is initially connected to the IP network 201 through DOCSIS, but can be ADSL, satellite or any other access technology. The gateway device 210 has an embedded voice module 207 also known as MTA module generally present in the DOCSIS gateway. A traditional telephone 208 is connected to the voice module 207, which converts analog signals of the traditional telephone to digital packets, and the digital data is sent to the IP network 201 as shown. The IP network 201 is also operable to receive digital voice packets from Satellite phone network data.

Figure 3:
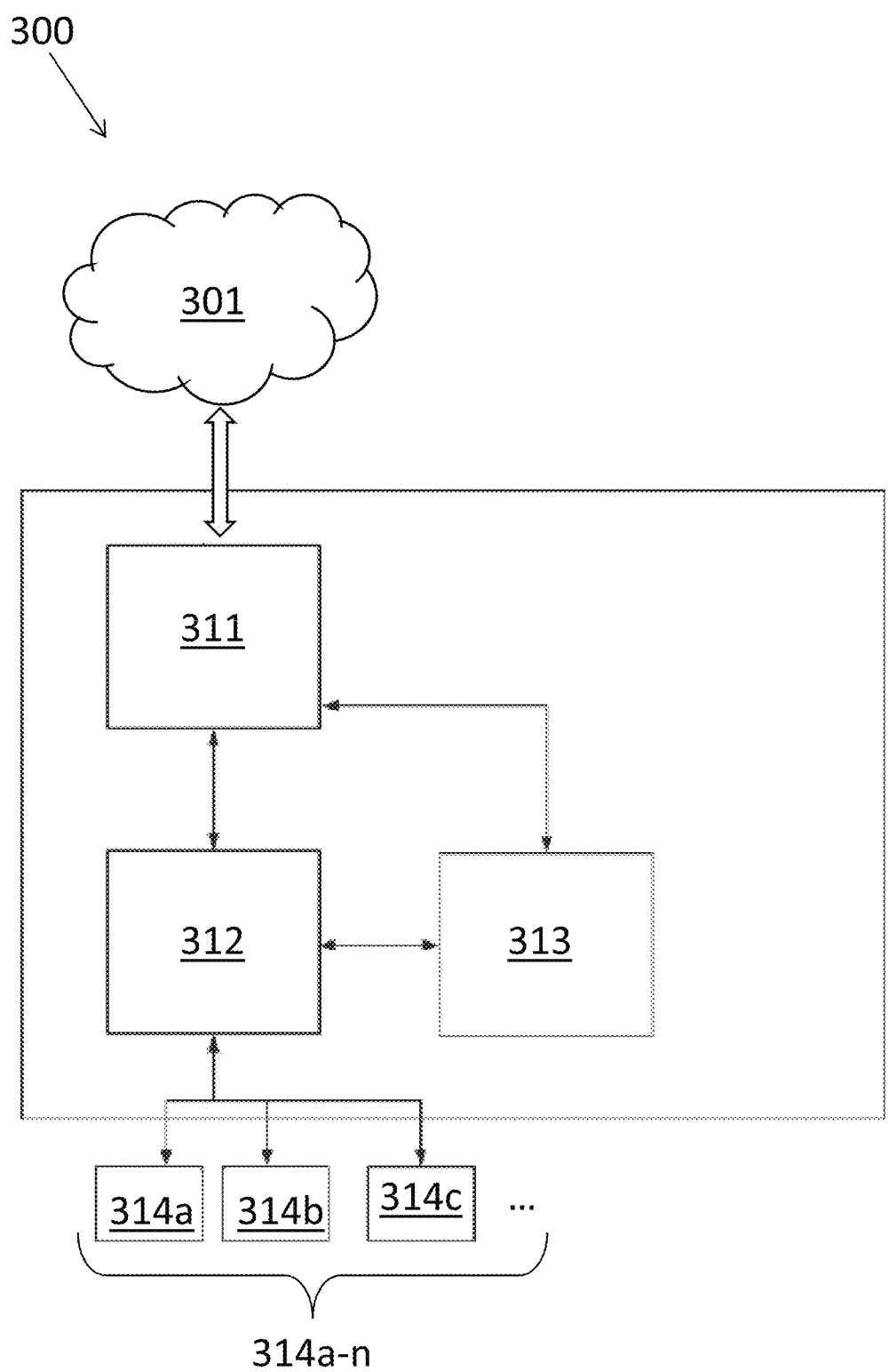
FIG. 3 illustrates details of the Device Domains of a voice service interface for allowing user control of a gateway.

FIG. 3 illustrates a schematic diagram of a home gateway device, shown generally at 300. Home gateway device 300 includes an IP network Interface 311, which sends and receives data from both a voice domain 312 and a gateway domain 313. IP network Interface 311 connects to the IP network 301 and delivers and receives digital data. Voice domain 312 is a voice module such as but not limited to an MTA module. Gateway domain 313 is the gateway module that is controlled or configured by way of the subject invention. IP network Interface 311 sends and receives digital data from the voice domain 312 and gateway domain 313. The voice domain 312 receives analog voice data from one or more landline client device telephones 314a-n.

Figure 4:
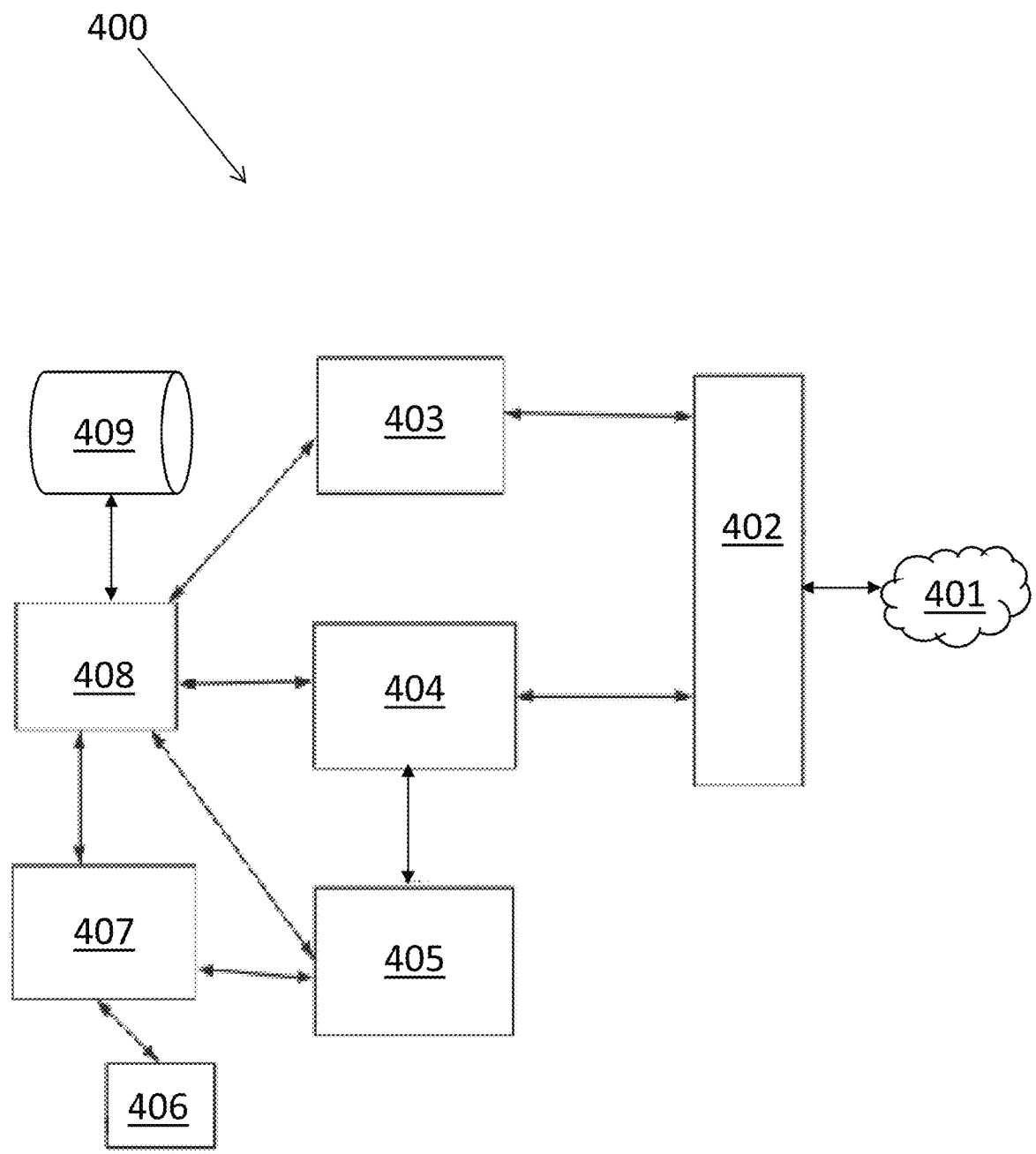
FIG. 4 illustrates more details of the Voice over IP Module Structure utilized by a voice service interface for allowing user control of a gateway.

FIG. 4 illustrates details of the Voice over IP Module structure, shown generally at 400. IP Network 401 is connected to IP Stack 402 operable with signaling processing 403 and media processing 404 in communication with voice processing module 405 (or digit processing module). A user telephone 406 communicates with a user device interface 407 whereupon call processing 408 operable with database 409 and voice processing module 405 (or digit processing module) are configured for voice service control (or digit entry control) of the GW. Voice processing 405 receives analog voice data and converts it to digit data, and vice versa, receives incoming digital voice data from the IP network and converts it to analog and sends the analog data to telephone 406 via user device interface 407. The analog voice calls are converted into packets of data. The packets travel like any other type of data, such as e-mail, over the public Internet and/or any private Internet Protocol (IP) network 401. Using a VoIP service, people can make calls with landline or cell phones. Database 409 is used to store the configured data of call features. For example, the database 409 stores the feature enable/disable flag, pre-configured numbers, which are allowed to invoke the gateway modification, feature of the subject invention, and the like.

Signal Processing 403 is used by the VoIP module to communicate the call information with the server and peers, by using protocols like SIP, H.323, MGCP/NCS and the like. For example, a module using SIP protocol may send a REGISTER message to tell a SIP server that it wants to use telephone number 12345. The server may respond an OK, record number 12345 and relate it with the device address in its database. Later, when an outside user makes a call to number 12345 and this call is routed to the SIP server, the server sends an SIP INVITE message to the device. These protocol processing, e.g. encoding/decoding of REGISTER, OK, INVITE messages are all carried out by this 'Signal Processing' function.

Media Processing 404 is used to send/receive the voice data over the IP network 401 during conversations using, for non-limited example, RTP/RTCP protocol. For example, a device may get enough information from the SIP messages, e.g. address/port/codec of the remote party, and use this information to talk with the remote. During the talking, their digitalized voice will be transmitted/received by this "Media Processing" function.

Call processing 408 is used to maintain the state of a call, control the call and coordinate between various function modules. It is the "brain" of a VoIP module. For example, when signaling processing 403 receives a SIP INVITE message and decodes it, there exists no intelligence to decide what to do next, so signaling processing 403 simply notifies the call processing 408. Call processing 408 analyzes all information and decides what to do with this message. Call processing 408 may then instruct the media processing 404 functions to prepare a RTP session for conversation, instruct the signal processing 403 function to respond with some specific message content and the like.

User device interface 407 is the hardware used to connect with user devices like telephones 406, microphones and the like. In a DOCSIS gateway, there could be a line card, which may have two telephone ports that can be used by the user to connect two phones. If the VoIP is running on a PC, a sound card is optionally provided, which can be connected with a microphone and handset. In a stand-alone gateway or router, this module may not be present and no outgoing call can be placed. In this case the subject invention is still operable because outside incoming calls can still be received to trigger the feature of this invention.

Voice processing 405 is used to convert the analog voice from user device interface 407 to digital format and process it before sending it out, and vice versa. An example of the Voice Processing function is a voice Digital Signal Processor (DSP). In a stand-alone gateway or router, this module may not be present. In this case the system still works because audios and tones can still be played to the remote caller by sending pre-recorded RTP media streams.

Figure 5:
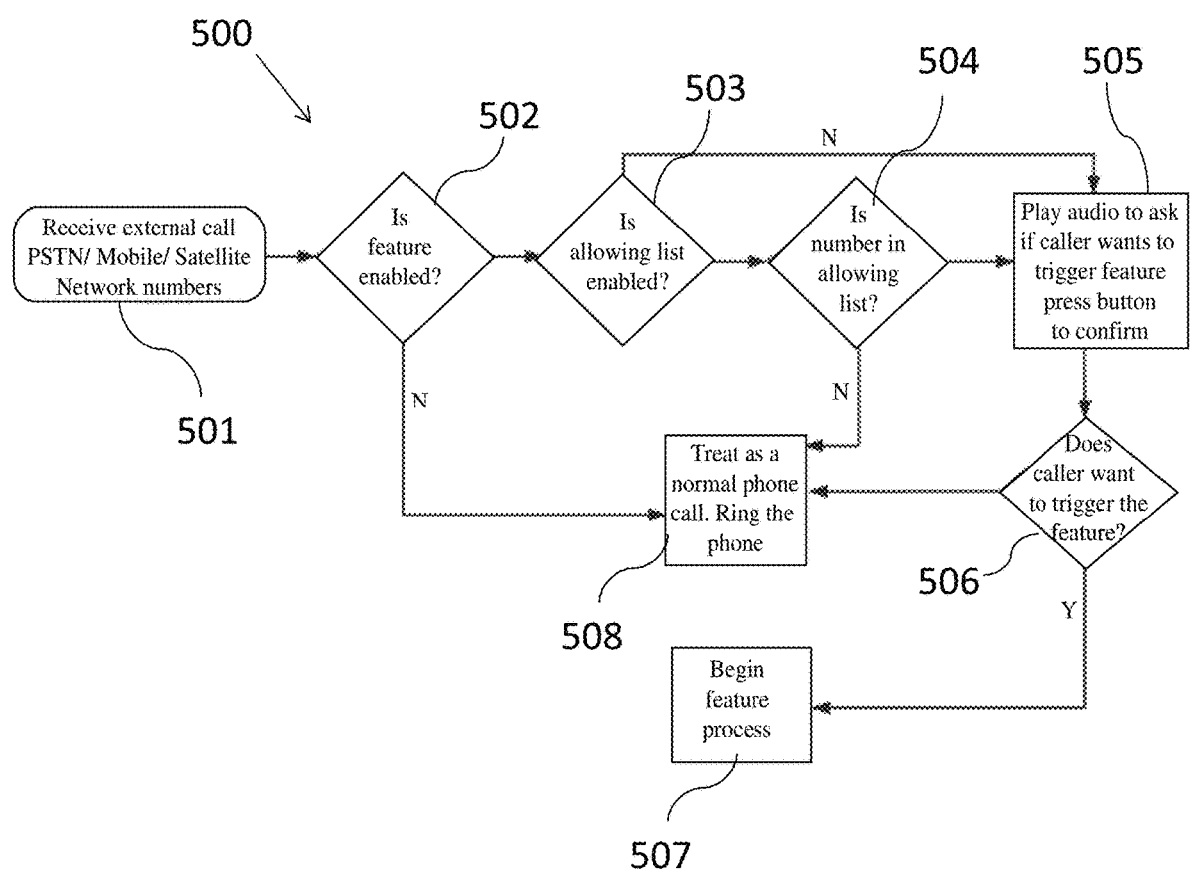
FIG. 5 is a flow chart depicting how a feature of the subject invention is triggered when a call is received from external numbers.

FIG. 5 is a flow chart depicting how a feature of the subject invention is triggered when an external call is received, shown generally at 500. The first step, "Receive an external Call" 501, is initially handled by the signaling processing function (see FIG. 4), for example, receiving a SIP INVITE. This function notifies "Call Processing", which then instructs "Signal Processing" to respond, and checks with the "Database" function to see if the feature of the subject invention is enabled at 502. If the feature is enabled, the next step queries "Is allowing list enabled?" at 503. If yes, the next step queries "Is number in allowing list?" at 504. If steps 503 and 504 are executed, in the next steps "Call Processing" may also instruct the "Media Processing"

function to connect with the remote and play a pre-recorded RTP stream file to ask if the caller wants to trigger the feature, at steps 505 and 506. "Call Processing" may also instruct the "User Device Interface" to ring the phone at 508. At step 507 the feature process begins.

Figure 6:
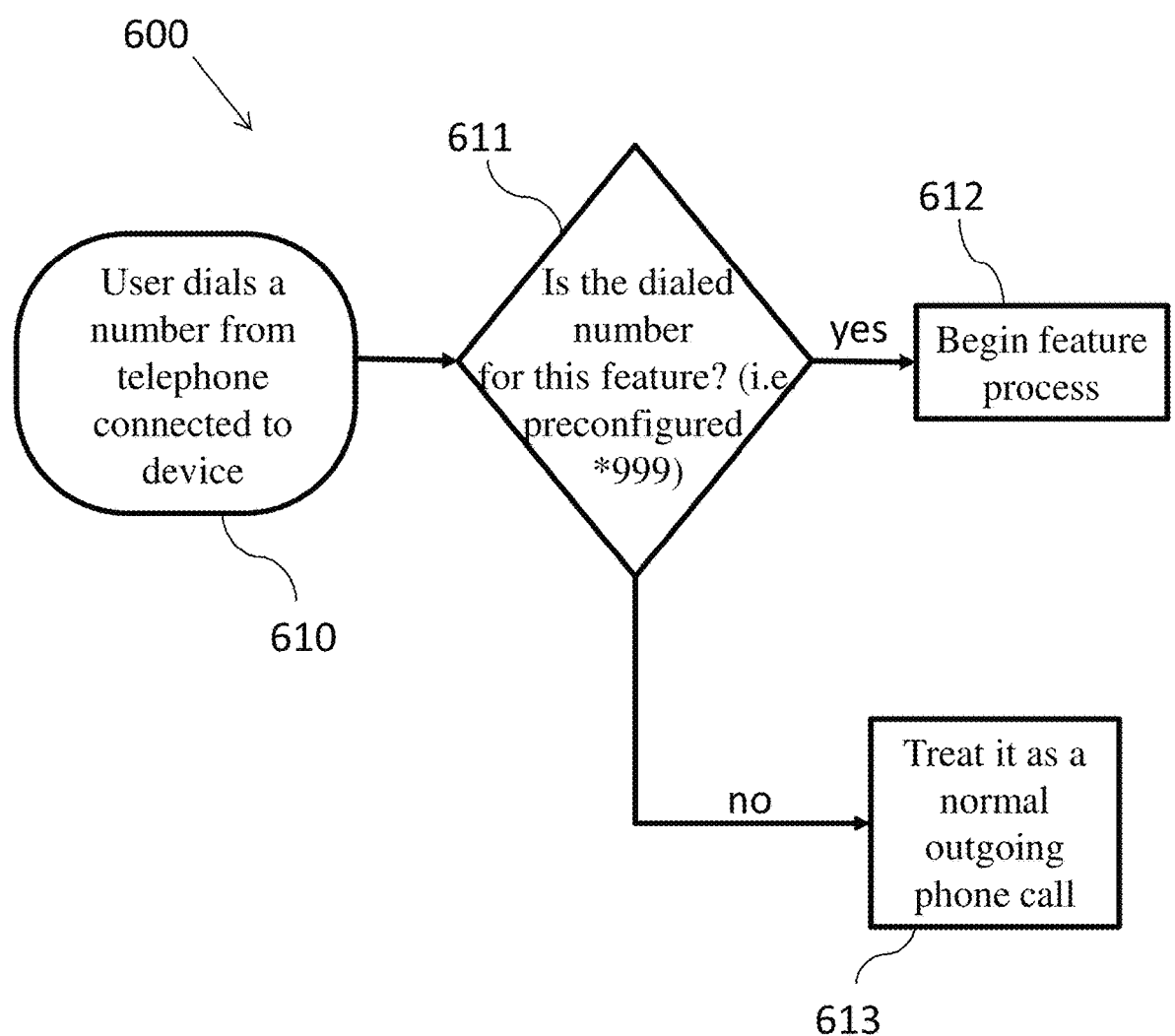
FIG. 6 is flow chart depicting how a feature of the subject invention is triggered when a call is received from a connected device.

FIG. 6 is a flow chart depicting how a feature of the subject invention is triggered when a call is received from a connected device, shown generally at 600. User dials a number from a telephone connected to the device at 610. Next, the Call Processing queries "Is the dialed number for this feature? (i.e. preconfigured *999)" at step 611. If "no", then at 613 the call is treated as a normal outgoing phone call. If "yes", then the user is directed to 612 to begin the feature process of controlling the gateway.

Figure 7:
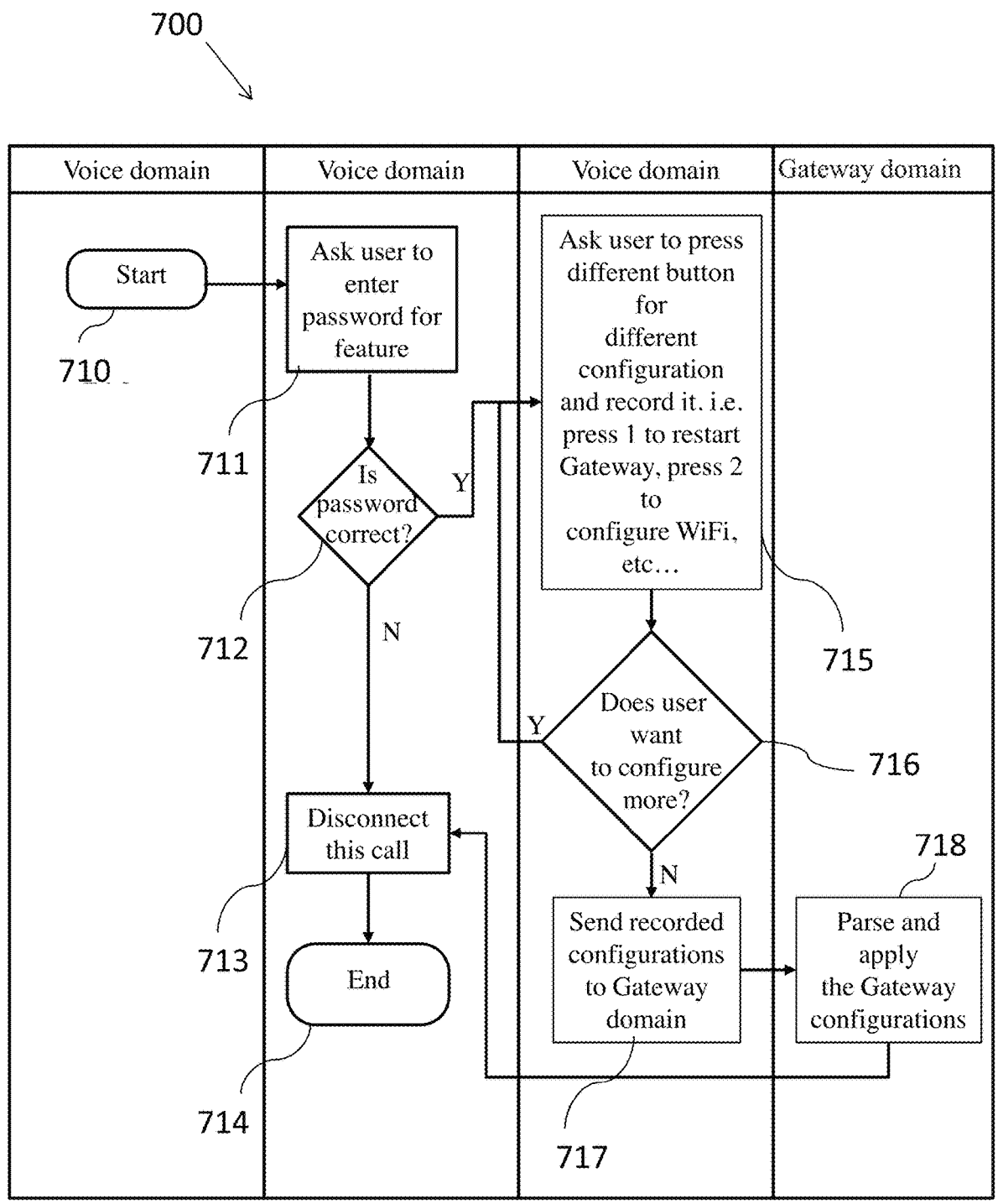
FIG. 7 is a flow chart depicting the feature process of the subject invention.

FIG. 7 is a flow chart depicting the feature process of the subject invention, shown generally at 700. After the feature is triggered as depicted in FIG. 5 and FIG. 6, the feature process begins at 710. At 711, the user is asked to enter a password. If the password is incorrect at 712, the call is disconnected 713 and ended 714. If the password is correct at 712, the user is asked to press different buttons for different configurations. The selection is recorded by the Call Processing function i.e. press 1 to restart gateway, press 2 to configure Wi-Fi, etc., shown at 715. Next, the user is prompted to respond if the user wants to configure more at 716. If "yes" then the user is redirected to 715; if "no", the recorded configurations are transmitted to the gateway domain at 717. Configurations are then parsed and applied to the GW configuration at 718. The call is then disconnected at 713 and ended at 714.

Figure 8:
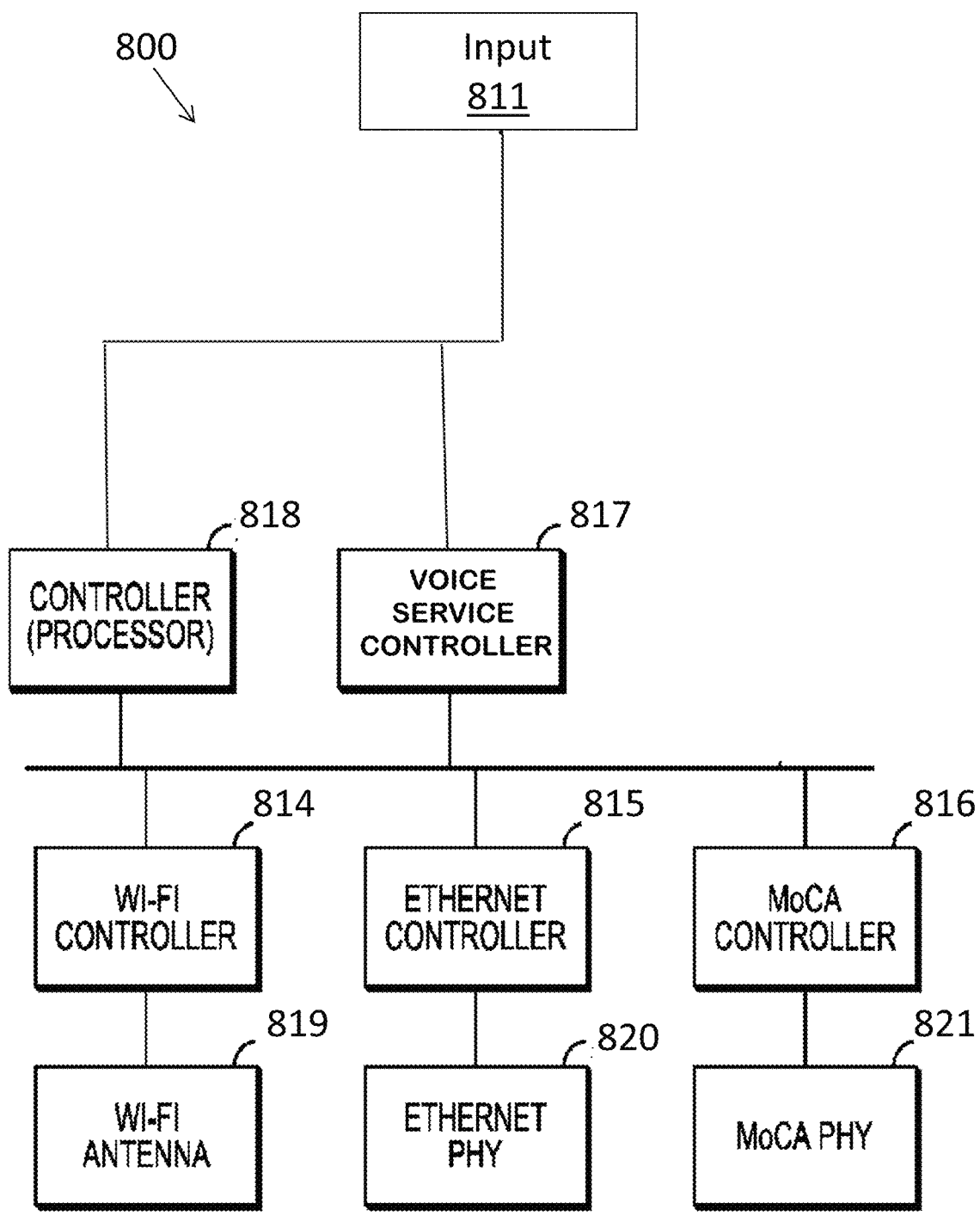
FIG. 8 is a block diagram of a gateway device according to the subject invention.

FIG. 8 is a block diagram of a gateway device adapted to be utilized with the subject invention, shown generally at 800. The gateway device provides internet applications including content streaming, internet access, e-mail, web browsing, chatting, etc., accessible through signals on input 811. Input 811 is used to access the Internet. Different access technologies can be used, including: DOCSIS, ADSL, Satellite, or Ethernet (when the device is a stand-alone GW or router). The gateway device may be in communication with one or more set-top boxes includes a plurality of tuners, Tuner 1, Tuner 2, through Tuner N, each of which selectively tunes to a requested frequency or channel of content.

The gateway device includes a controller 818, which could be implemented by an integrated circuit or circuits or by a processor that converts content signals to appropriate signals for wireless (e.g. Wi-Fi or LTE) transmission via the wireless controller 814 and wireless antenna 819. The gateway device includes an Ethernet controller 815 and/or a MoCA controller 816 by which the gateway device can be networked with other gateway devices, or any other networking capable device. The Ethernet controller 815 and the MoCA controller 816 interface to the network via the Ethernet PHY (physical transceiver) 820 and MoCA PHY (physical transceiver) 821, respectively.

The gateway device also includes a Gateway Voice Service Controller 817, which operates with a user's telephone device in controlling, configuring and/or diagnosing controller processor 818 and input 811 of gateway 800. The gateway device can be in the form of a so called "set top box", AP, extender AP, etc., or may be built into a television or other media content playing apparatus.

Those skilled in the art will appreciate that the invention, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) logarithmic and execution instructions, activation signals or software, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

The present invention may be implemented as any combination of a system, a method, an integrated circuit, and a computer program on a non-transitory computer readable recording medium.

The voice service apparatuses, and/or gateway devices may be in the form of or integrated within an access point, set-top box or other standalone device, or may be incorporated in a television or other content playing apparatus, or other device and the scope of the present invention is not intended to be limited on such forms.

The components of the content voice service apparatuses and gateway devices may be implemented as Integrated Circuits (IC), Application-Specific Integrated Circuits (ASIC), or Large Scale Integrated circuits (LSI), system LSI, super LSI, or ultra LSI components which perform a part or all of the functions of the gateway devices. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program controlling a processor to perform the functions of any of the components or combinations thereof. Any of the components may be implemented as a CPU or other processor reading and executing a software program from a recording medium such as a hard disk or a semiconductor memory.

It is also contemplated that the implementation of the components of the present invention can be done with any newly arising technology that may replace any of the above implementation technologies.

While this specification contains many specific implementation details, these should not be construed as limitations on the scope of any invention or of what may be claimed, but rather as descriptions of element that may be specific to particular embodiments of particular inventions. Certain elements that are described in this specification in the context of separate embodiments can also be implemented in combination in a single embodiment. Conversely, various elements that are described in the context of a single embodiment can also be implemented in multiple embodiments separately or in any suitable subcombination. Moreover, although elements may be described above as acting in certain combinations and even initially claimed as such, one or more elements from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A voice service interface apparatus of a home wireless gateway for enabling user control of said home wireless gateway through a voice service process, the voice service interface apparatus comprising: a voice over Internet Protocol (VoIP) service controller including an embedded multimedia terminal adaptor (E-MTA) integrated within said home wireless gateway, wherein said home wireless gateway a database storing at least one of a registered phone number of a user associated with said home wireless gateway and a predetermined dial-in code for triggering the voice service process, wherein the voice service process provides configuration, control, or diagnostics of the home wireless gateway, wherein said VoIP service controller is operable to: interface with a telephonic communication device of a user to receive a call, wherein the call is for the voice service process, wherein said home wireless gateway sends information of the call to a database that stores at least one of a registered phone number of a user associated with said home wireless gateway and a pre-configured dial-in code for invoking the voice service process, wherein the voice service process provides configuration, control, or diagnostics of the home wireless gateway, refer to the database to determine that the voice service process is enabled, refer to the database to determine that an allowing list is enabled, refer to the database to determine whether a phone number associated with the telephonic communication device matches the registered phone number of the user in the allowing list or a user input received from the telephonic communication device matches the predetermined dial-in code for triggering the voice service process, and in response to determining that the phone number associated with the telephonic communication device matches the registered phone number of the user or the user input matches the predetermined dial-in code: transmit one or more audio recordings to the telephonic communication device that prompt the user for different input relating to different gateway functions or settings, wherein the different input includes at least one of providing different voice responses and pressing different buttons of the telephonic communication device, receive one or more user inputs relating to one or more gateway functions or settings from said telephonic communication device in response to the one or more audio recordings, record the one or more user inputs by a call processing function; process the one or more recorded user inputs relating to the one or more gateway functions or settings to generate gateway configuration entries; and a gateway controller integrated within said home wireless gateway, wherein said gateway controller is operable to: receive said gateway configuration entries from said VoIP service controller, wherein said gateway configuration entries are operable to change function features of said home wireless gateway, wherein said function features of said home wireless gateway include home gateway device reboot, Wi-Fi enabling and disabling configurations, parental control enabling and disabling configurations, time set functionalities, and configurations of integrated devices and parse and apply the gateway configuration entries to perform one or more of control, configuration, and diagnosis of said home wireless gateway based on the voice service process.

2. The voice service interface apparatus as recited by claim 1, wherein said telephonic communication device is one of a telephone, mobile phone or mobile device including audible relays for communication.

3. The voice service interface apparatus as recited by claim 1, wherein said E-MTA integrated within said home wireless gateway provides telephone service.

4. The voice service interface apparatus as recited by claim 3, wherein said home wireless gateway comprises a DOCSIS home gateway.

5. The voice service interface apparatus as recited by claim 3, wherein said E-MTA is operable to convert analog voice data information from said telephonic communication device to digital media packets.

6. The voice service interface apparatus as recited by claim 1, further comprising:
an input for receiving an input signal;
a wireless controller configured to communicate via wireless with a client device, and receive from the client device internet access requests for providing internet applications;
a controller configured to establish internet connections with the client device via the wireless controller, and send the requested content to the client device; and
network connection circuitry.

7. The voice service interface apparatus as recited by claim 1, wherein said home wireless gateway includes any of an access point, a network extender containing an access point, a repeater, or any combination thereof.

8. A voice service interface method of a home wireless gateway for enabling user control of a home wireless gateway through a voice service process, the voice service interface method comprising: establishing a connection between a telephonic communication device of a user and a voice over Internet Protocol (VoIP) service controller of the home wireless gateway, wherein said VoIP service controller includes an embedded multimedia terminal adaptor (E-MTA) integrated within said home wireless gateway, and wherein the voice service process provides configuration, control, or diagnostics of the home wireless gateway; interfacing said VoIP service controller with said telephonic communication device to receive a call, wherein the call is for the voice service process, wherein said home wireless gateway sends information of the call to a database that stores at least one of a registered phone number of a user associated with said home wireless gateway and a pre-configured dial-in code for invoking the voice service process, wherein the voice service process provides configuration, control, or diagnostics of the home wireless gateway; referring to the database to determine that the voice service process is enabled; referring to the database to determine that an allowing list is enabled; determining, by said VoIP service controller, whether a phone number associated with the telephonic communication device matches the registered phone number of the user in the allowing list or a user input received from the telephonic communication device matches the predetermined dial-in code for triggering the voice service process, by referring to the database; in response to determining that the phone number associated with the telephonic communication device matches the registered phone number of the user or the user input matches the predetermined dial-in code: transmitting, by said VoIP service controller, one or more audio recordings to the telephonic communication device that prompt the user for different input relating to different gateway functions or settings, wherein the different input includes at least one of providing different voice responses and pressing different buttons of the telephonic communication device, receiving, by said VoIP service controller, one or more user inputs relating to one or more gateway functions or settings from said telephonic communication device in response to the one or more audio recordings, recording the one or more user inputs by a call processing function; and processing, by said VoIP service controller, the one or more recorded user inputs relating to the one or more gateway functions or settings to generate gateway configuration entries; receiving, by a gateway controller, said gateway configuration entries from said VoIP service controller, wherein said gateway controller is integrated within said home wireless gateway, and said gateway configuration entries are operable to change function features of said home wireless gateway, wherein said function features of said home wireless gateway include home gateway device reboot, Wi-Fi enabling and disabling configurations, parental control enabling and disabling configurations, time set functionalities, and configurations of integrated devices; and parsing and applying said gateway configuration entries, by said gateway controller, to perform one or more of control, configuration, and diagnostic of said home wireless gateway based on the voice service process.

9. The voice service interface method as recited by claim 8, wherein said telephonic communication device is one of a telephone, mobile phone or mobile device including audible relays for communication.

10. The voice service interface method as recited by claim 9, wherein said E-MTA integrated within said home wireless gateway provides telephone service.

11. The voice service interface method as recited by claim 10, wherein said E-MTA is operable to convert analog voice data information from said telephonic communication device to digital media packets.

12. The voice service interface method as recited by claim 8, wherein said telephonic communication device is connected to said gateway.

13. The voice service interface method as recited by claim 8, wherein said telephonic communication device is external to said home wireless gateway and is capable of dialing into said home wireless gateway through said VoIP service controller.

14. The voice service interface method as recited by claim 8, wherein the home wireless gateway includes any of an access point, a network extender containing an access point, a repeater, or any combination thereof.

15. One or more non-transitory computer readable media of a home wireless gateway having instructions for enabling user control of a home wireless gateway through a voice service process, wherein the instructions when executed are operable to cause one or more processors to perform operations comprising: establishing a connection between a telephonic communication device of a user and a voice over Internet Protocol (VoIP) service controller of the home wireless gateway, wherein said VoIP service controller includes an embedded multimedia terminal adaptor (E-MTA) integrated within said home wireless gateway, and wherein the voice service process provides configuration, control, or diagnostics of the home wireless gateway; interfacing said VoIP service controller with said telephonic communication device to receive a call, wherein the call is for the voice service process, wherein the home wireless gateway sends information of the call to a database that stores at least one of a registered phone number of a user associated with the home wireless gateway and a pre-configured dial-in code for invoking the voice service process, wherein the voice service process provides configuration, control, or diagnostics of the home wireless gateway; referring to the database to determine that the voice service process is enabled, referring to the database to determine that an allowing list is enabled, determining, by said VoIP service controller, whether a phone number associated with the telephonic communication device matches the registered phone number of the user in the allowing list or a user input received from the telephonic communication device matches the predetermined dial-in code for triggering the voice service process, by referring to the database; in response to determining that the phone number associated with the telephonic communication device matches the registered phone number of the user or the user input matches the predetermined dial-in code: transmitting, by said VoIP service controller, one or more audio recordings to the telephonic communication device that prompt the user for different input relating to different gateway functions or settings, wherein the different input includes at least one of providing different voice responses and pressing different buttons of the telephonic communication device, receiving, by said VoIP service controller, one or more user inputs relating to one or more gateway functions or settings from said telephonic communication device in response to the one or more audio recordings, recording the one or more user inputs by a call processing function; processing, by said VoIP service controller, the one or more recorded user inputs relating to the one or more gateway functions or settings to generate gateway configuration entries; receiving, by a gateway controller, said gateway configuration entries from said VoIP service controller, wherein said gateway controller is integrated within said home wireless gateway, and said gateway configuration entries are operable to change function features of said home wireless gateway, wherein said function features of said home wireless gateway include home gateway device reboot, Wi-Fi enabling and disabling configurations, parental control enabling and disabling configurations, time set functionalities, and configurations of integrated devices; and parsing and applying said gateway configuration entries, by said gateway controller, to perform one or more of control, configuration, and diagnostic of said home wireless gateway based on the voice service process.

16. The non-transitory computer readable media as recited by claim 15, wherein said telephonic communication device is one of a telephone, mobile phone or mobile device including audible relays for communication.

17. The non-transitory computer readable media as recited by claim 15, wherein said E-MTA integrated within said home wireless gateway provides telephone service.

18. The non-transitory computer readable media as recited by claim 17, wherein said E-MTA is operable to convert analog voice data information from said telephonic communication device to digital media packets.

19. The non-transitory computer readable media as recited by claim 15, wherein said home wireless gateway includes any of an access point, a network extender containing an access point, a repeater, or any combination thereof.

* * * * *